United States Patent [19]

Paul et al.

[11] Patent Number: 5,513,062
[45] Date of Patent: Apr. 30, 1996

[54] POWER SUPPLY FOR A REDUNDANT COMPUTER SYSTEM IN A CONTROL SYSTEM

[75] Inventors: Jürgen Paul, Stutensee; Anton Pallek, Baden-Baden, both of Germany

[73] Assignee: Landis & Gyr Business Support AG, Zug, Switzerland

[21] Appl. No.: 201,543

[22] Filed: Feb. 25, 1994

[30] Foreign Application Priority Data

Mar. 5, 1993 [CH] Switzerland ............... 00663/93

[51] Int. Cl.⁶ .................................. H02H 3/24
[52] U.S. Cl. ................. 361/90; 361/18; 361/92
[58] Field of Search .................. 361/90, 91, 92, 361/93, 18

[56] References Cited

U.S. PATENT DOCUMENTS

| | | | |
|---|---|---|---|
| 4,638,175 | 1/1987 | Bradford | 361/90 |
| 4,772,980 | 9/1988 | Curtis | 361/90 |
| 4,951,171 | 8/1990 | Tran | 361/90 |

FOREIGN PATENT DOCUMENTS

| | | | |
|---|---|---|---|
| 0352217 | 1/1990 | European Pat. Off. | F23N 5/24 |
| 0397913 | 11/1990 | European Pat. Off. | G05B 9/03 |
| 2183113 | 5/1987 | United Kingdom | H02H 3/05 |

*Primary Examiner*—Brian K. Young
*Assistant Examiner*—S. Jackson
*Attorney, Agent, or Firm*—Meltzer, Lippe, Goldstein, Wolf, Schlissel & Sazer

[57] ABSTRACT

A simplified and economical power supply for redundant computer systems of control systems is disclosed. These control systems may include burner control for furnaces. The safety and reliability of the system are increased. The power supply comprises one single common voltage supply in the form of a self-monitoring power pack unit SN having a power pack NT, an undervoltage monitor ÜW and an overvoltage monitor. The self-monitoring power pack unit communicates with the redundant computer units P1, P2 via a supply line 1e. This single self-monitoring power pack unit is used according to the invention instead of the known fully parallel two-channel operation with two computer units and two power packs with appertaining components and supply lines. The overvoltage monitor ÜW and the undervoltage monitor UW are preferably checked for operability through the periodic transmission of a test signal.

17 Claims, 3 Drawing Sheets

POWER SUPPLY FOR A REDUNDANT COMPUTER SYSTEM IN A CONTROL SYSTEM

FIELD OF THE INVENTION

The invention relates to a power supply and its application in control systems of heating plant burners. The power supply can be used in redundant computer systems for the control systems.

BACKGROUND OF THE INVENTION

Redundant computer systems for critical control systems requiring a high degree of safety are known. Conventionally, two fully parallel controls are used. Each parallel control has a computer system with a power supply and signal paths. "Two out of three" systems are also known. These systems are parallel partial embodiments of systems having components which individually are more unreliable or high-grade parallel controls for installations to be controlled. The level of safety measures taken is generally dictated by the risk level and damage in case of uncontrolled failure of the system and by the applicable legal requirements.

Such computer systems control, for example, the burner of gas firing installations, aerial navigation systems, and similar systems. Control of an installation is effected through two parallel channels, so-called "two-channel systems", i.e., with two power pack units, two distribution voltage controls, two computers and two parallel signal paths. The failure of one of the systems can be recognized because the parallel computers constantly compare process data and computations with each other. If the data diverge, one of the systems has malfunctions or has failed, the controls put the operation of the control device in a safe static state. Thus, if a malfunction occurs, the computers detect it automatically and switch off the process. Some other technical safety action can also be exerted upon the control system. The control system can also be a regulating unit in the narrower sense.

This known solution is comparatively expensive since the entire control system must be duplicated and particularly expensive components such as power pack units, must be available twofold.

SUMMARY OF THE INVENTION

It is an object of the instant invention to reduce the cost of the power supply without reducing safety. Another object of the present invention is to design the power supply of the system with fewer components.

These objectives are achieved by this invention by providing a power supply for a redundant computer system for a control system. The redundant computer system has first and second computer units connected in parallel to the control system, wherein the computer units perform mutual verification so that a safety action can be exerted on the control system in case of a malfunction. The power supply comprises a self-monitoring power pack unit as a common power supply connected by a voltage distribution line and a signal path to the computer units, and connected to the control system by the voltage distribution line. The self-monitoring power pack unit further comprises, a power pack, having a constant voltage regulator having a regulated voltage and a stabilization circuit for a distribution or supply voltage, an undervoltage monitor for monitoring the regulated voltage, an overvoltage monitor for monitoring the regulated voltage, and wherein the power pack and the monitors interact so that an autonomous safety action is exerted on the control system in case of an overvoltage or an undervoltage.

According to the invention the cost of a safe and reliable power supply is reduced considerably without reducing safety and reliability requirements. This is accomplished by using only one power pack unit instead of using two separate power pack units for the two parallel computers. The power pack unit has special features. This power pack unit supplies the entire computer system. If necessary it also supplies the control or regulating installation with electrical voltage and can also act directly upon components of the regulated installation. The power pack unit is self-monitoring. It is connected to both computer units and it communicates with either computer unit via signal paths and, if necessary, via voltage supply lines. The invention not only ensures that excessive power supply fluctuations cannot do any damage, but it also ensures that changes in the internal distribution voltage do not produce unsafe conditions, even though the power supply voltage remains constant.

The safety of this system is ensured in different ways which are characterized hereinbelow.

The number of components needed for the power supply is reduced due to the fact that now only one power supply, however slightly enlarged, is used. This reduction also reduces the number of component failures which are statistically distributed and increase in direct proportion with the number of components. The self-monitoring power pack unit is equipped with an undervoltage monitor and an overvoltage monitor, as well as the power pack itself which regulates the distribution voltage.

A locking flip-flop can be an additional piece of equipment which prevents the system from being switched back on unintentionally when it has been switched off because of a malfunction. For instance, manual confirmation of the malfunction shut-off can then be requested. Only after an acknowledgment signal can the flip-flop be deactivated manually by the operator. As a result, the often intentional automatic resumption, and in this case the unstable system state, is avoided after a successful shut-off in the case of a malfunction.

The overvoltage and undervoltage monitors check whether the voltage of the power pack unit remains within a given desired range so as to avoid errors in the computers which are supplied with current from the power pack. This desired range is symmetric in relation to the desired value of the voltage. The voltage can be, for example, 5 V, but any other value may be selected by varying the components. In other words, the value may be selected by using a voltage dividing circuit to determine the basic current of a transistor. Thereby, voltage errors in the distribution voltage are detected at the hardware level. In particular all the relays of the control system are switched off so that all outputs of important control aggregates, such as a gas valve for gas burners, are left without voltage and are put in a safe state. In the case where the control aggregate is a gas valve, the access for the fuel gas to the burners is switched off.

Through these measures or steps, the circuit guarantees reliable detection of "external" errors and malfunctions and reliable safe shut-off of the installation directly by switching off the distribution voltage of the relays of the control system. At the same time a message can be transmitted to the computers. However, the computers are operational only subject to the type of error present at the time.

Furthermore, in another special embodiment of the invention the power supply, that is the self-monitoring power pack, has the capability of detecting errors inside the voltage monitoring circuit and carrying out safety measures, e.g. a shut-down. This capability is necessary since safe shut-down can no longer be ensured in this case because the appertaining monitoring device will fail if overvoltage or undervoltage occurs. The computers then take over the testing of the voltage monitoring circuits using software. In particular, the testing is done by transmitting a test signal to the circuit via overvoltage and undervoltage test inputs. The error occurrence is simulated in that the test signal simulates an undervoltage or an overvoltage to the voltage monitors. The monitors are then actuated and transmit this information to the computer which then immediately deactivates the test signal. The time between transmission of the signal and its deactivation is so brief that the corresponding relays in the safety circuits of the installation do not yet fall away. The corresponding routines for "actual" overvoltage or undervoltage are not actuated. However, if the message is not transmitted the computer knows that the corresponding monitor has failed. The computer shuts off the installation and informs the operator, via a display, of the reason for and the location of the failure, if possible.

In another special embodiment of the invention, the inventive power supply is used for a control or regulating system for burners of heating plants or similar installations. The power supply is not, however, restricted to this application. This is a very important application, particularly in smaller burners having capacities of approximately up to 30 KW and used in single homes or upstairs apartments, because the cost of the power pack unit in duplicate plays a considerable role, while safety and reliability must nevertheless be ensured in these situations. If a malfunction occurs in the gas valve and the blower, for instance, the error is caught by the parallel computers which monitor each other. If, however, an error occurs in the sole power supply itself and, therefore, induces both computer units into wrong conclusions so that they do not detect the error themselves or are no longer operational, the error is caught through the self-monitoring power pack unit. The self monitoring power pack unit can then act directly, via relays, upon the burner, e.g., by closing the gas valves, and, thus, prevents an unsafe condition.

Such a self-monitoring power pack unit is especially advantageous for the power supply of two mainly redundant computing units to control furnaces, since the self monitoring power pack units are low in cost and meet the standards for such installations.

BRIEF DESCRIPTION OF THE DRAWINGS

Particularly preferred embodiments of this invention are described in the following description and through the following drawings in which.

DETAILED DESCRIPTION OF PREFERRED EMBODIMENTS

Figure 1:
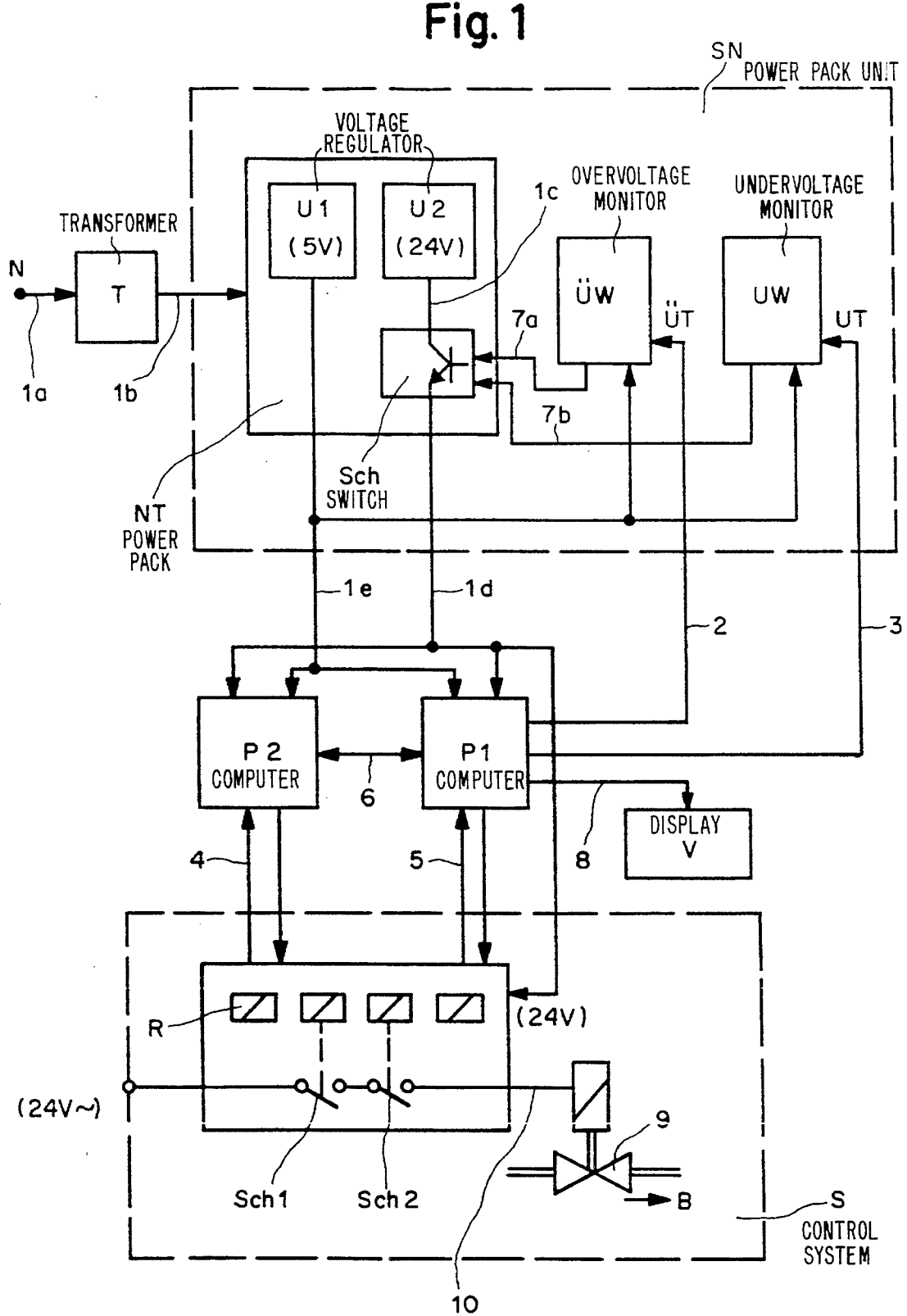
FIG. 1 shows a schematic overview of important system components of the present invention and their relationships to each other in combination with a control system for an automatic gas furnace.

According to FIG. 1, the network N supplies the transformer T via the network connection line 1a with network A.C. voltage, e.g., 230 V. The transformed low voltage, e.g., 24 V, goes over the supply line 1b to the self-monitoring power pack unit SN which includes the power pack NT, the overvoltage monitor ÜW, and the undervoltage monitor UW and, via supply line 1c, to the switch Sch. The power pack NT ensures the smoothing and rectification of the A.C. voltage, and its regulation voltage U1 to 5 V and stabilization voltage to 24 V. The power pack NT further comprises low pass filtering in order to filter out high-frequency interference which is present in spite of the uncoupling or disconnection of the transformer T. The overvoltage monitor ÜW and the undervoltage monitor UW monitor regulate voltage U1 within an adjustable range for a predetermined desired value, in this case 5 V. A drop or rise beyond the desired range limit results in direct shut-off of the installation via the voltage distribution line 1d in the electric line 10 of the control system S.

The computer units P1, P2 verify the functioning capacity of the overvoltage monitor ÜW and of the undervoltage monitor UW in cycles, at least once every 24 hours, through the signal path 1e. The verification can also be carried out by only one of the computer units P1, P2, or the computer units in alternation. If a malfunction is detected in the voltage monitors ÜW, UW of the self-monitoring power pack NT, the computer sends signals of the malfunction via the signal line 8 in the display device V. In the display device V the cause for the shut-down can also be indicated.

Both computer units P1, P2 control or regulate the process. For instance, the computer units regulate control system CS by use of the relays R and receive signal values and process state magnitudes fed back from there via the signal lines 4, 5. "Parallel" processing of these values constantly endows the computers with autonomous values. The parallel processing also makes possible an additional comparison of the values for conformity via the data exchange line 6. In case of false signal values and discrepancies, the computer units P1, P2 shut down the process or shut off line 10 as a safety measure.

Figure 2:
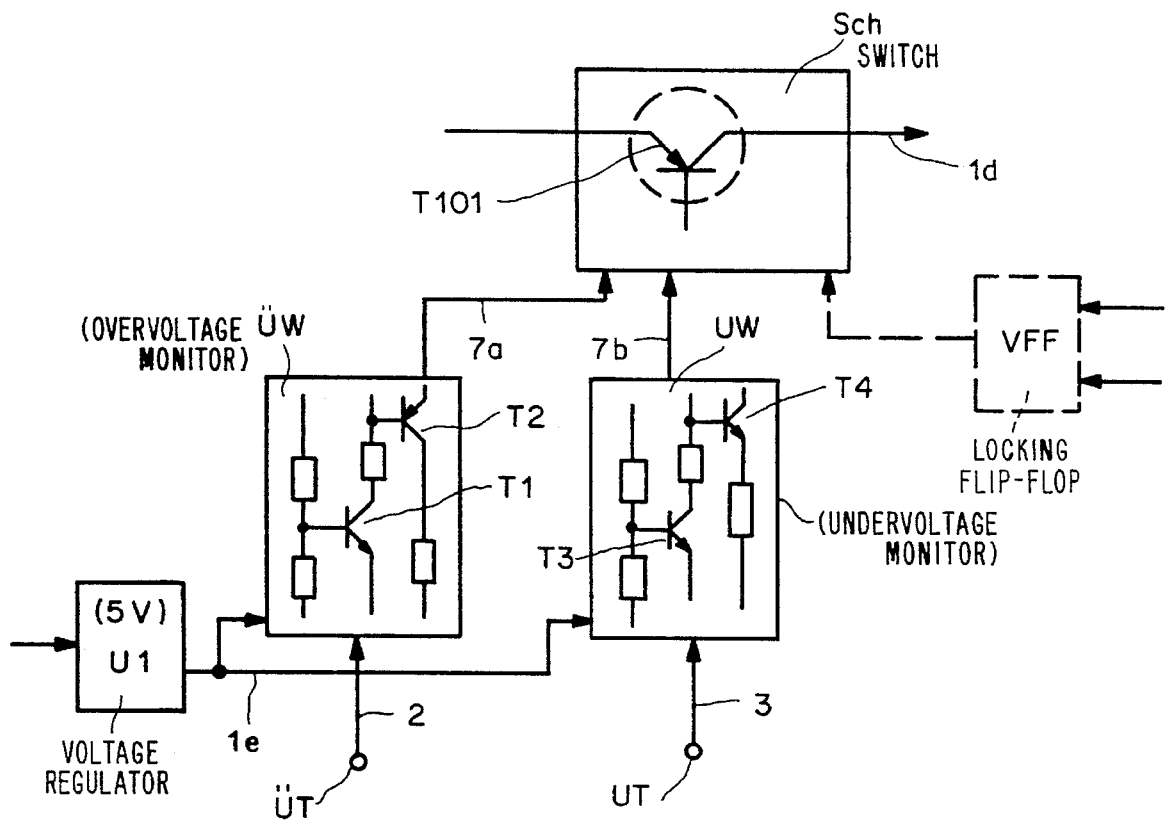
FIG. 2 shows a schematic diagram of the overvoltage and undervoltage monitor as part of the self-monitoring power pack unit according to the present invention.

If the voltage fails, i.e., there is an undervoltage or an overvoltage and the safe operation of the computer units P1, P2 is no longer ensured, the power pack NT autonomously takes over the task of switching off the process or the relays R. This switch off is carried out via the internal structure of the voltage distribution circuits, e.g., according to FIG. 2. In a preferred embodiment of FIG. 2, the working of the voltage monitors Ü W, UW is shown schematically. The undervoltage monitor UW and also the overvoltage monitor ÜW are based on transistor logic. They monitor the regulated voltage U1 of the power pack NT. At the same time, the transistors T1, T2, T3, T4 are triggered by a voltage divider circuit. In the overvoltage monitor ÜW, the corresponding transistor T1 switches through the collector current when a given upper desired value of a range is exceeded by a reference value or a desired value. The transistor T1 now has low impedance at the output. The higher current causes the main transistor T101, which assumes the role of a switch Sch, to switch off. This results in no current flowing in the distribution line 1d, thereby, causing all relays R in the control system to fall off. As a result, corresponding safety measures are actuated. In this case, the gas valve 9 of the burner B of the gas furnace and the ignition become idle so that access of the combustion gas to the burner B is also switched off.

In the case of the undervoltage monitor UW, the transistor T3 becomes of high impedance at the output when the voltage drops below the lower desired value of the range. As a result, the transistor T4 is closed and has a high impedance, thereby closing or locking the main transistor T101, which acts as switch Sch and shuts off the associated relay R. Both voltage monitors ÜW, UW are, furthermore, provided with an undervoltage test input UT or with an overvoltage test input OT. By means of these test inputs the computer units P1, P2 are able to carry out the appropriate tests for their own malfunctions. Both monitors ÜW, UW can be mounted together with a locking flip-flop VFF and the power pack NT on an electronic board.

Figure 3:
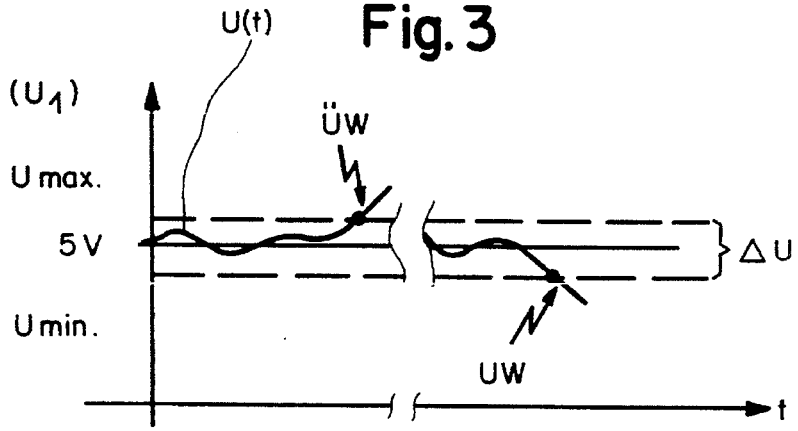
FIG. 3 shows a voltage/time diagram representing the safety measures when the expected malfunctions occur.

According to FIG. 3, the voltage U(t) is monitored as a function of time t. There exists an adjustable range around a special reference or desired value, e.g., 5 V, limited by the upper threshold voltage $U_{max}$ having an upper desired value, e.g., 6 V, and the lower threshold voltage $U_{min}$ having a lower desired value, e.g., 4 V. The upper threshold value $U_{max}$ deviates from the lower threshold value $U_{min}$ by the voltage difference $\Delta U$, e.g., 2 V. If the voltage, which may fluctuate within the indicated range, exceeds the upper threshold voltage $U_{max}$, the overvoltage monitor ÜW is triggered and actuates the safety switch-off of the switch Sch or of the main transistor T101. This also applies to the undervoltage monitor UW when the voltage drops below the lower threshold voltage $U_{min}$.

The locking flip-flop VFF, prevents the control system S from being switched back on automatically following a shut-down due to a malfunction, e.g., in the switch Sch. The locking flip-flop is used as an additional device in the self-monitoring power pack. If, for example, the flame in the burner goes out the control system first attempts to ignite the flame automatically before a shut-down due to a malfunction occurs. If, however, a "malfunction" is due only to a brief excess or insufficiency of voltage, and if the regulated voltage U1 is back within the desired voltage range after a brief time span, the locking flip-flop VFF, prevents in all instances, the resumption of normal operation in the heating plant until the operator re-actuates the control system after checking the plant. The desired voltage range is within the voltage differential $\Delta U$, as in FIG. 3. The operator is alerted to the malfunction by the display device.

Figure 4:
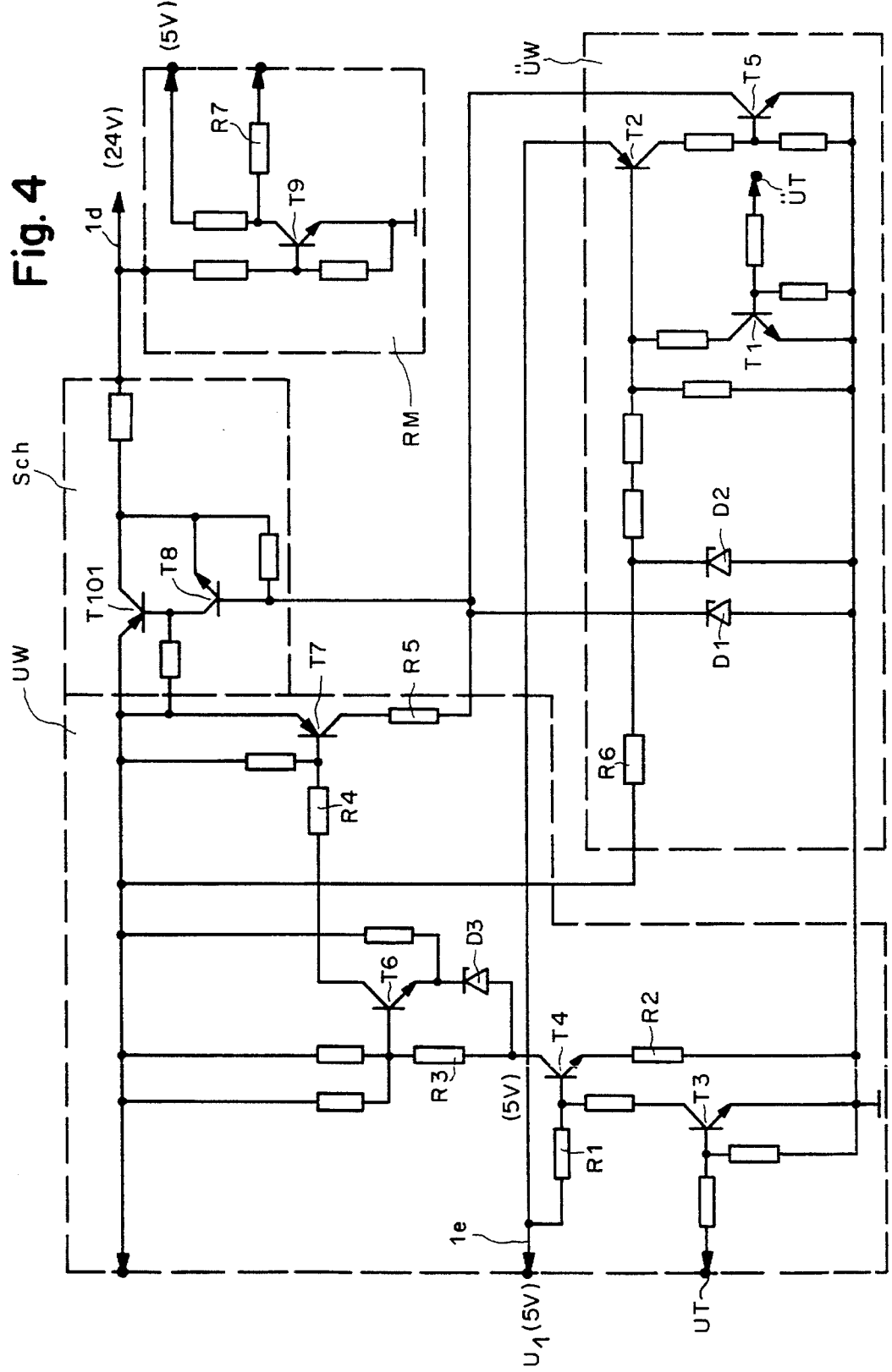
FIG. 4 shows a schematic diagram of a preferred embodiment of the voltage monitor in a self-monitoring power pack unit.

FIG. 4 schematically shows the control connections of the undervoltage monitor UW and of the overvoltage monitor Üto the switch Sch. These connections are explained as follows:

The undervoltage monitor UW for the voltage U1, here of 5V, for the two computer units P1, P2 is arranged so that voltages of less than a lower threshold voltage $U_{min}$, e.g., 4 V are detected. The full monitored voltage U1 is at the base of transistor T4. Here, the transistor T3 cuts off when electric current is neglected by resistor R1. The monitored voltage U1 is then transformed by the resistor R2 and current flows, first, to the collector circuit of the transistor T4 and, then, to the evaluation circuit. The evaluation circuit compares the voltage appearing at resistor R3 with the Zener-diode voltage of diode D3 which is used as a reference. There, a voltage transformation takes place with a subsequent comparison to a reference voltage. If the monitored voltage U1 is within the admissible tolerance range $\Delta U$, see FIG. 3, the transistor T6 switches through, which in turn results in the through-switching of transistor T7. Transistor T7 controls the current for the Zener diode D1 in the overvoltage monitor. The output voltage of transistor T7 is stabilized as a function of the voltage at the Zener-diode D1. The voltage U2, e.g., 24 V, on line 1d is released only when the monitored voltage U1 lies above the lower threshold value $U_{min}$, otherwise a shut-down occurs.

To test the functioning capability of the undervoltage monitor UW for stuck-at-error, the computer unit P1 transmits a test impulse for a very brief time span of approx. 0.3 ms to the transistor T3. This causes the monitored voltage U1 to be reduced from 5 V, to 3.5 V, for this example, at the base of the transistor T4. This reduction causes the voltage U2 of 24 V to be switched off via switch Sch. The acknowledgment or answering signal sent over transistor T9, resistor R7 and the associated electrical components is then evaluated by the computer unit P1.

The overvoltage monitor ÜW is also designed for a distribution voltage U1, 5 V in this case, for the computer units P1, P2. In this case, voltages of more than the upper threshold voltage value $U_{max}$, 6 V, are detected here. If such higher voltages occur, the relay voltage U2 is switched off on the distribution line 1d, thereby causing one of the switches, Sch1 or Sch2, within the relay group R of the control system S to deenergize or drop at any rate and the gas valve 9 to shut off. In the illustrated example, the relay voltage is 24 V.

The transistor T1 compares the monitored voltage with a reference voltage which is formed via resistor R6 and the Zener-diode D2 with subsequent voltage divider. At the base of transistor T2 a voltage of approx. 5 V appears when transistor T1 is not actuated. If, however, the monitored voltage U1 rises above 6 V the transistor T2 is switched through. As a result transistor T5 is switched through. The transistor T5 closes the Zener-diode D1 briefly and causes the switch Sch to switch off the relay voltage in the distribution line 1d.

In order to also test the functioning capability of the overvoltage monitor ÜW for stuck-at-error, the computer unit P1 transmits a test impulse to the transistor T1. In this example, the test pulse lasts for approximately 0.3 ms. This reduces the reference voltage to such an extent that the transistor T2 switches through, thereby switching off the relay voltage for a brief moment. Then the acknowledgment or answering signal from transistor T7, resistor R7 and associated components, is again evaluated by the computer unit Pl.

The stabilization of the voltage U2, 24 V, on the distribution line 1d is effected by transistors T8 and T101. These transistors stabilize the voltage to the Zener-diode voltage, of 24 V, which constitutes the reference voltage. The precurrent for transistor T8 and the Zener-diode is made available via resistor R5 and the through-switched transistor T7. The transistors T8, T101 can also be used as a switch Sch in case of overvoltage or undervoltage.

As explained earlier, the acknowledgment or answering signal states whether the distribution voltage in the 24-V distribution line 1d "is present" or "is not present" by means of the acknowledging or answering circuit RM with the assistance of transistor T9. Transistor T9 transmits a low signal, e.g., 0 V, to the computer unit P1 in the presence of the distribution voltage of 24 V in line 1d, while a high signal, e.g., 5 V, is transmitted back to the computer unit P1 in the absence of the distribution voltage of 24 V in the distribution line 1d.

Therefore, in the power supply according to the invention, the power pack NT comprises a constant-voltage regulator U1, a voltage of 5 V in this example, for the computer units P1 and P2 and a stabilization circuit for the relay distribution voltage U2, e.g., 24 V. In addition, the self-monitoring power pack unit SN comprises the overvoltage monitor ÜW and the undervoltage monitor UW with test inputs ÜT and UT, respectively, from the computer unit P1. Finally an acknowledgment circuit or answering RM is provided to signal the computer unit P1 whether the relay distribution voltage U2 is present or absent.

In this manner, the safe operation of the control system, in particular for automatic furnace for gas burners, is ensured. However, the invention can also be used with automatic furnaces using oil burners. Since no two-channel power supply is required for the computer units P1 and P2, considerable savings can be achieved even though the distribution voltage U2 of the relays R is switched off. In other words, even though the safety measures are acting upon the control system S when the regulated voltage U1 for the computer units P1, P2 is outside a desired range. Since the overvoltage monitor ÜW and the undervoltage monitor UW are also checked for correct operation, it is possible to detect all stuck-at-error occurrences which no longer ensure safe operation of the control system S.

We claim:

1. A power supply for a redundant computer system for a control system, having first and second computer units connected in parallel to said control system, said computer units perform mutual verification so that safety action can be exerted on said control system in case of a malfunction, comprising, a self-monitoring power pack unit as a common power supply connected by a voltage distribution line and a signal path to said computer units, and connected to said control system by said voltage distribution line, wherein said self-monitoring power pack unit further comprises, a power pack, having a constant voltage regulator having a regulated voltage and a stabilization circuit for a distribution or supply voltage, an undervoltage monitor for monitoring said regulated voltage, an overvoltage monitor for monitoring said regulated voltage, and wherein said power pack and said monitors interact so that an autonomous safety action is exerted on said control system in case of an overvoltage or an undervoltage, and wherein said power pack further comprises a switch connected to said computer units by said voltage distribution line, to said stabilization circuit by an electric supply line, and to said voltage monitors indicating an overvoltage or an undervoltage and wherein said switch shuts off voltage supply on said voltage distribution line to said control system in case of a malfunction.

2. The power supply of claim 1, wherein said control system further comprises relays connected to said computer units and said autonomous safety action is exerted on said relays.

3. The power supply as in claim 1, wherein said switch is a transistor switch.

4. The power supply of claim 1, wherein said self-monitoring power supply unit further comprises a locking flip-flop with an output going to said switch for preventing unwanted re-actuation of the control system following said safety action.

5. The power supply of claim 1, further comprising an acknowledgment circuit for detecting presence or absence of said distribution voltage for transmittal to said control system and for transmitting information pertaining to said absence or presence to at least one of said computer units.

6. The power supply of claim 1, wherein said self-monitoring power pack unit has highest priority in safety measure for acting directly upon the control system via said voltage distribution line.

7. The power supply of claim 1, wherein said voltage in said constant voltage regulator is a desired voltage within a range having an upper threshold voltage and a lower threshold voltage and between 10% and 30% of the regulated voltage of said computer units.

8. The power supply of claim 1, wherein said power supply is used in a control system for burners of heating plants having low capacity, said power pack supplies voltage to said computer units while monitoring itself, and said computer units are integrated into a regulated circuit for burner control.

9. The power supply of claim 8, wherein said heating plants have a capacity of up to approximately 50 kw.

10. The power supply of claim 8, wherein said control system further comprises critical system components which act directly upon corresponding relays of the control system while circumventing said computer units and are shut off by said self-monitoring power pack unit.

11. The power supply of claim 1, wherein said overvoltage monitor further comprises an overvoltage test input, said undervoltage monitor further comprises an undervoltage monitor, and said self-monitoring power supply unit further comprises a means for transmitting test voltage signals simulating an overvoltage and an undervoltage to said overvoltage and undervoltage inputs, respectively, in order to test response of said switch in absence of sufficient testing time to carry out said safety action.

12. The power supply of claim 11, wherein said means for transmitting is a microprocessor.

13. The power supply of claim 11, wherein said simulated test voltage signals actuate said monitors to transmit a signal to said first computer unit which deactivates said test signals, thereby detecting errors in said monitors.

14. A power supply for a redundant computer system for a control system, having first and second computer units connected in parallel to said control system, said computer units perform mutual verification so that safety action can be exerted on said control system in case of malfunction, comprising, a self-monitoring power pack unit as a common power supply connected by a voltage distribution line and a signal path to said computer units, and connected to said control system by said voltage distribution line, wherein said self-monitoring power pack unit further comprises, a power pack, having a constant voltage regulator having a regulated voltage and a stabilization circuit for a distribution or supply voltage, an undervoltage monitor for monitoring said regulated voltage, an overvoltage monitor for monitoring said regulated voltage, and wherein said power pack and said monitors so that an autonomous safety action is exerted on said control system in case of an overvoltage or an undervoltage, wherein said overvoltage monitor further comprises an overvoltage test input, said undervoltage monitor further comprises an undervoltage monitor, and said self-monitoring power supply unit further comprise a means for transmitting test voltage signals simulating an overvoltage and an undervoltage to said overvoltage and undervoltage input, respectively.

15. The power supply of claim 14, wherein said means for transmitting is a microprocessor.

16. The power supply of claim 14, wherein said simulated test voltage signals actuate said monitors to transmit a signal to said first computer unit which deactivates said test signals, thereby detecting errors in said monitors.

17. A power supply for a redundant computer system for a control system, having first and second computer units connected in parallel to said control system, said computer units perform mutual verification so that safety action can be exerted on said control system in case of a malfunction, comprising, a self-monitoring power pack unit as a common power supply connected by a voltage distribution line and a signal path to said computer units, and connected to said control system by said voltage distribution line, wherein said self-monitoring power pack unit further comprises, a power pack, having a constant voltage regulator having a regulated voltage and a stabilization circuit for a distribution or supply voltage, an undervoltage monitor for monitoring said regulated voltage, an overvoltage monitor for monitoring said regulated voltage, and wherein said power pack and said monitors interact so that an autonomous safety action is exerted on said control system in case of an overvoltage or an undervoltage, and further comprising an acknowledgement circuit for detecting presence or absence of said distribution voltage for transmittal to said control system and for transmitting information pertaining to said absence or presence to at least one of said computer units.

* * * * *